United States Patent [19]

Chan et al.

[11] Patent Number: 5,414,555
[45] Date of Patent: May 9, 1995

[54] METHOD FOR THE MANUFACTURE OF A THREE-MIRROR OPTICAL SYSTEM AND THE OPTICAL SYSTEM RESULTING THEREFROM

[75] Inventors: Gilbert Y. Chan, Diamond Bar, Calif.; Kenneth G. Preston, Foxboro, Mass.

[73] Assignee: Aerojet-General Corporation, Rancho Cordova, Calif.

[21] Appl. No.: 48,575

[22] Filed: Apr. 15, 1993

Related U.S. Application Data

[63] Continuation of Ser. No. 820,010, Jan. 13, 1992, abandoned.

[51] Int. Cl.⁶ .............................................. G02B 17/06
[52] U.S. Cl. .................................. 359/366; 359/365; 359/859; 359/858
[58] Field of Search ............... 359/366, 365, 859, 858, 359/866, 864

[56] References Cited

U.S. PATENT DOCUMENTS

| | | |
|---|---|---|
| 2,729,143 | 1/1956 | White . |
| 3,527,526 | 9/1970 | Silvertooth ..................... 359/859 |
| 3,801,180 | 4/1974 | MaGuire et al. . |
| 4,226,501 | 10/1980 | Shafer ............................ 359/859 |
| 4,239,342 | 12/1980 | Aurin et al. . |
| 4,293,186 | 10/1981 | Offner . |
| 4,331,390 | 5/1982 | Shafer . |
| 4,469,414 | 9/1984 | Shafer . |
| 4,497,540 | 2/1985 | Breckinridge et al. . |
| 4,563,064 | 1/1986 | Garas ............................. 359/858 |
| 4,707,604 | 11/1987 | Guscott ......................... 359/858 |
| 4,733,955 | 3/1988 | Cook . |
| 4,737,021 | 4/1988 | Korsch . |
| 4,812,028 | 3/1989 | Matsumoto . |
| 5,009,494 | 4/1991 | Iossi et al. . |
| 5,078,502 | 1/1992 | Cook ............................. 359/859 |

FOREIGN PATENT DOCUMENTS 648931  2/1979  U.S.S.R. ............................. 359/858

Primary Examiner—Jon W. Henry
Attorney, Agent, or Firm—Leonard Tachner

[57] ABSTRACT

The fabrication of an off axis three-mirror telescope on only two substrates allowing two of mirrors to be formed on a common substrate, such as by means of diamond turning. The common substrate configuration is made possible by utilizing a common vertex for both the primary and tertiary mirrors so that alignment subsequent to fabrication requires placement of only two elements. In addition, all three mirrors in this invention share a common optical axis enabling an extremely simple mounting and housing design. The present invention is applicable for use in electro-optical imaging sensors operating from visible wavelengths to long infrared wavelengths. A telescope is formed by the assembly of three off-axis mirrors, including a primary mirror, a secondary mirror and a tertiary mirror. All three mirrors share a common system optical axis. In addition, the primary and tertiary mirrors also share a common vertex enabling the fabrication of two mirror surfaces on a common substrate with a diamond turning process, thus eliminating the need to align the primary and tertiary mirrors subsequent to fabrication. Consequently, system alignment consists of the placement of only two elements, namely the first element, the common substrate on which the primary and tertiary mirrors are formed and the second element which is the secondary mirror.

6 Claims, 4 Drawing Sheets

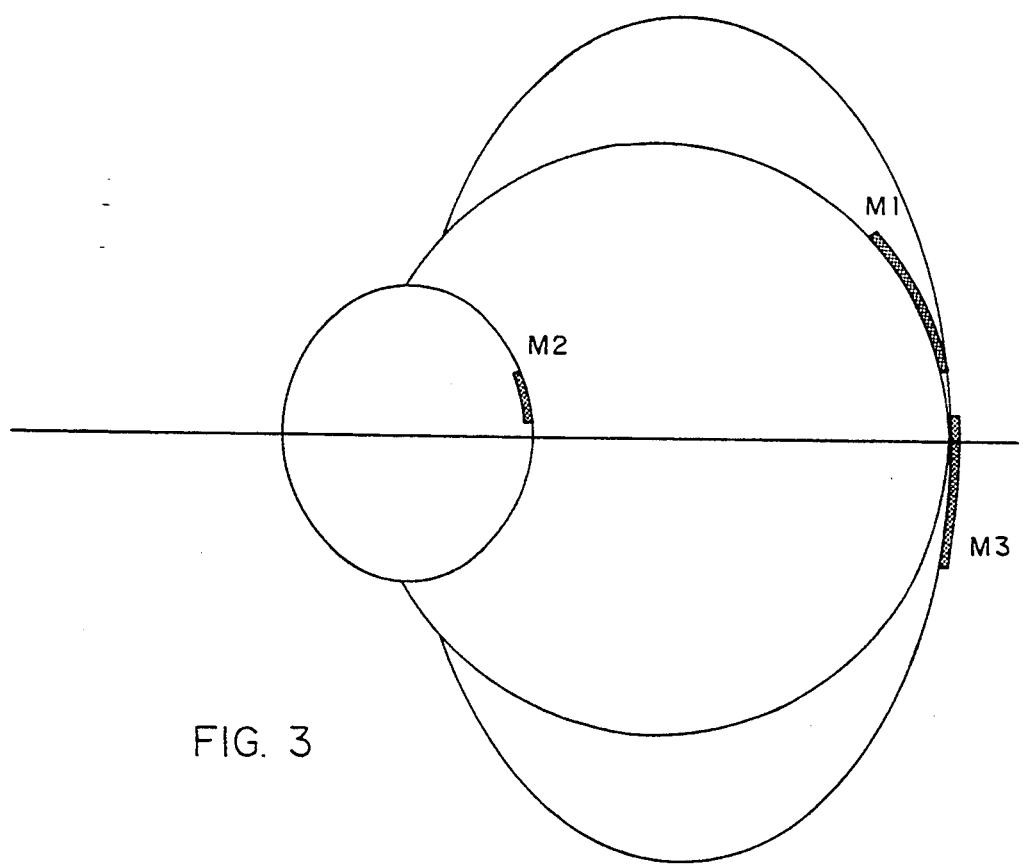
FIG. 3
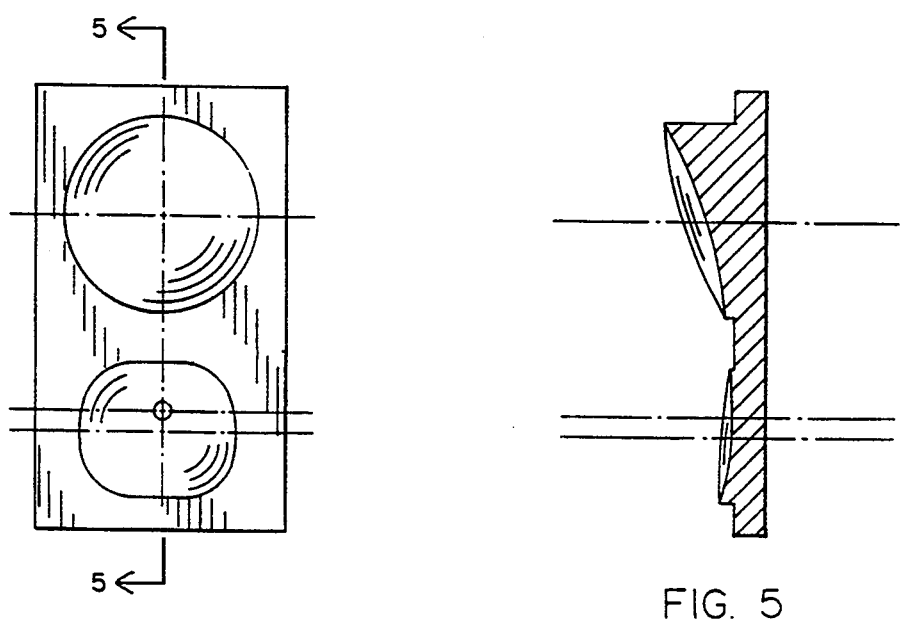
FIG. 4
FIG. 5

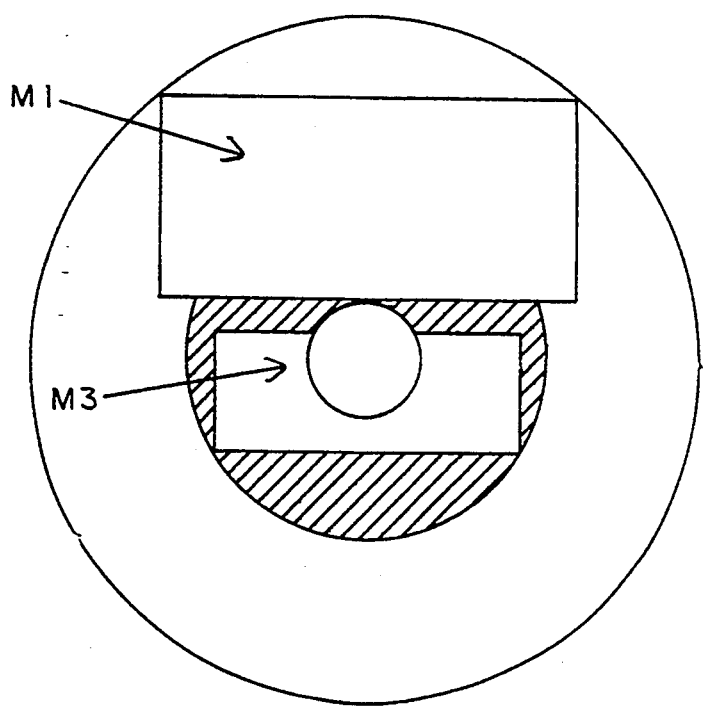
FIG. 6
PRIOR ART
FIG. 7
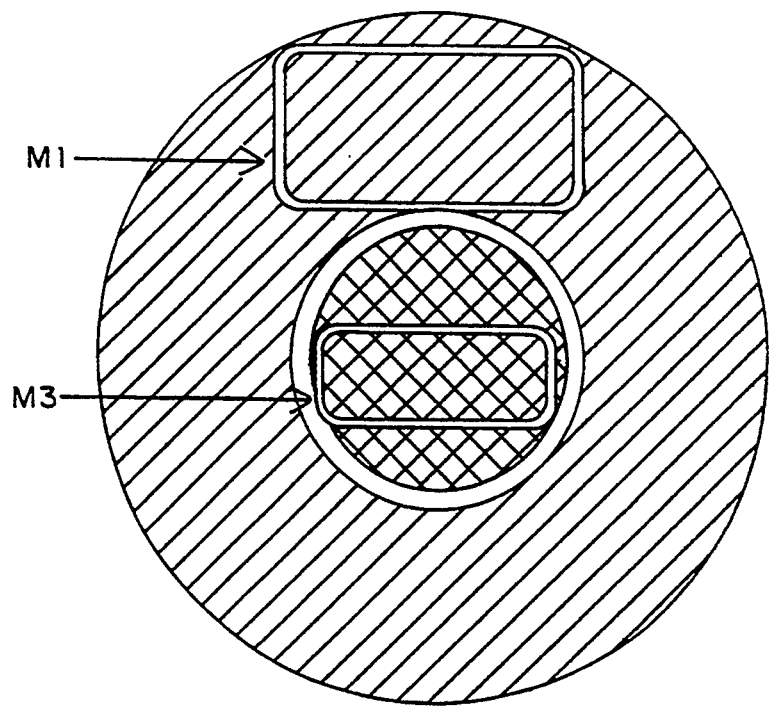

METHOD FOR THE MANUFACTURE OF A THREE-MIRROR OPTICAL SYSTEM AND THE OPTICAL SYSTEM RESULTING THEREFROM

This is a continuation of application Ser. No. 07/820,010, filed on Jan. 13, 1992, now abandoned.

BACKGROUND OF THE INVENTION

1. Field of the Invention

The present invention relates generally to three-mirror telescopes and more specifically to a highly manufacturable three-mirror optical telescope in which the primary and tertiary mirrors share a common vertex and all mirrors share a common axis. The primary-tertiary mirror pair is fabricated on a common substrate with single point diamond turning, eliminating the need for aligning these two mirrors, resulting in great simplification of the fabrication and alignment processes. The optical system of the invention is particularly suitable for use as a three-mirror collimator or telescope in spacecraft applications.

2. Prior Art

Three-mirror optical systems useable as collimators and telescopes, for example in spacecraft applications, are well known in the art. One example of such a three-mirror optical system designed primarily as a telescope, is disclosed in U.S. Pat. No. 4,240,707 to Wetherell. This patent discloses radiation from an off-axis primary mirror reflected back to an on-axis convex secondary mirror, which, in turn, reflects the radiation to an off-axis tertiary mirror. The radiation is then reflected from the tertiary mirror to a focal plane, which is also off axis. Another example of a three-mirror system is shown in U.S. Pat. No. 4,265,510 to Cook, wherein a primary mirror, a secondary mirror and a tertiary mirror form an anastigmatic relayed image-forming optical system in which the image field is off the optical axis and the entrance pupil coincides with the primary mirror and an intermediate image is formed between the secondary and tertiary mirrors. Still another relevant prior art patent, namely U.S. Pat. No. 4,737,021 to Korsch, discloses a three-mirror collimator or telescope having a focal plane positioned on a first side of the optical axis and which directs a diverging beam of radiation upon a concave tertiary mirror which is also positioned on the first side of the optical axis and which reflects the received radiation to an on-axis convex secondary mirror in a converging pattern. A secondary mirror reflects the received radiation in a first converging, then diverging pattern upon a concave primary mirror which is positioned on the second side of the optical axis. The primary mirror reflects the received radiation as a collimated beam to the real entrance pupil which is located either on or near the optical axis, but which need not be precisely centered on the optical axis. The primary mirror reflects the radiation in a first converging, then diverging pattern upon the on axis secondary mirror which in turn reflects the radiation upon the off axis tertiary mirror. The tertiary mirror then reflects and focuses the received radiation upon the focal plane.

One of the principal disadvantages of all of the known three-mirror collimator or telescope optical systems of the prior art is that they are all configured in such a manner that requires each of the three mirrors to be separately fabricated and then assembled and aligned thereafter as a precise optical system. The alignment of a three-mirror system in which all three of the mirror elements has been separately fabricated is a labor-intensive task which is more conducive to error because of the need for precise placement of the three mirrors relative to one another in the system. In most high performance three-mirror systems, the stringent misalignment tolerance between mirrors, particularly the primary-tertiary pair, renders it impractical to fabricate. Consequently, a method for fabricating such a three-mirror system which reduces the complexity of the alignment and placement task, would be a highly desirable feature. Such a fabrication method is disclosed herein and constitutes a principal feature of the present invention.

Other prior art patent disclosures deemed relevant to the present invention to varying degrees comprise the following:

U.S. Pat. Nos.
2,729,143 White
3,801,180 MaGuire et al
4,239,342 Aurin et al
4,293,186 Offner
4,331,390 Shafer
4,469,414 Shafer
4,497,540 Breckinridge et al
4,733,955 Cook
4,737,021 Korsch
4,812,028 Matsumoto
5,009,494 Iossi et al U.S. Pat. No. 4,737,021 to Korsch is relevant to the present invention in that it is directed to a three-mirror telescope arranged with a common optical axis. Referring to FIG. 2, there is shown a three-mirror telescope having an entrance pupil disposed on the optical axis, through which a collimated beam is received by the primary mirror for reflection to the on-axis secondary mirror, which in turn reflects the radiation upon the off-axis tertiary mirror for reflection to the focal plane.

U.S. Pat. No. 4,812,028 to Matsumoto is directed to a reflection type projection optical system for projecting micropattern images, such as semiconductor device patterns. Referring to FIG. 1, the reflecting surfaces M1 and M3 are formed on a common substrate with all of the mirrors in the system having a common optical axis. Although the two mirrors M1 and M3 have a common radius of curvature, the two mirrors have a common vertex.

U.S. Pat. No. 4,293,186 to Offner is directed to an off-axis optical system. Although directed to a projection system, the optical system comprises two spherical mirrors, a convex mirror and a concave mirror, wherein the system is arranged to provide three reflections. The mirrors are arranged with their centers of curvature along the system axis with the concave mirror having a portion above the axis providing one set of reflections and another portion below the axis providing another set of reflections.

U.S. Pat. No. 4,733,955 to Cook is directed to a reflective optical triplet for a telescope. Referring to FIGS. 3 and 4, there is shown, the plan and elevation views for the optical system wherein the radiation beam enters through the real pupil for reflection from the primary mirror upon the secondary mirror and subsequently the tertiary mirror, for impinging upon a sensor. The optical elements are arranged to have a common optical axis. The primary and tertiary mirrors are not disclosed as being formed on a common substrate.

U.S. Pat. No. 4,497,540 to Breckinridge et al is directed to an optical system for viewing a remote surface. FIG. 7 illustrates an embodiment wherein the optical elements are arranged so as to have a common optical axis and a spherical mirror is defined by two reflecting surface portions. However, the surface portions each have the same radius of curvature.

SUMMARY OF THE INVENTION

The present invention comprises a fabrication method which overcomes the aforementioned disadvantages of the prior art. More specifically, the invention described herein enables the fabrication of an off axis three-mirror telescope on only two substrates. The present invention overcomes the aforementioned labor intensive and sometimes impractical tasks of aligning a three-mirror system by allowing two of mirrors to be formed on a common substrate, such as by means of diamond turning. The common substrate configuration is made possible by utilizing a common vertex for both the primary and tertiary mirrors so that alignment subsequent to fabrication requires placement of only two elements. In addition, all three mirrors in this invention share a common optical axis enabling an extremely simple mounting and housing design. The present invention is applicable for use in electro-optical imaging sensors operating from visible wavelengths to long infrared wavelengths. A telescope is formed by the assembly of three off-axis mirrors, including a primary mirror, a secondary mirror and a tertiary mirror. All three mirrors share a common system optical axis. In addition, the primary and tertiary mirrors also share a common vertex enabling the fabrication of two mirror surfaces on a common substrate with a diamond turning process, thus eliminating the need to align the primary and tertiary mirrors subsequent to fabrication. Consequently, system alignment consists of the placement of only two elements, namely the first element, the common substrate on which the primary and tertiary mirrors are formed and the second element which is the secondary mirror. Because of the unique common substrate fabrication technique of the present invention, material cost is reduced by a significant amount, thus adding to the labor cost savings derived from the reduction in the complexity of the alignment task. In addition, there is improved structural stability due to the use of a common substrate for both the primary and tertiary mirrors. There is also a reduction in mechanical deformation which is normally incurred in connecting mirrors to an optical support structure. There is also a significant reduction in weight which is especially important for spaceborne applications. Also, because of the significant reduction in the likelihood of alignment errors between the primary and tertiary mirrors, there is a significant increase in the tolerance for mirror fabrication errors in a constant tolerance budget for the entire optical system.

OBJECTS OF THE INVENTION

It is therefore a principal object of the present invention to provide a method for manufacturing a three-mirror optical system which greatly simplifies the fabrication and alignment processes required to realize such a system.

It is an additional object of the present invention to provide a three-mirror anastigmatic optical system for use as telescopes, collimators and the like, wherein the primary and tertiary mirrors share a common vertex and all mirrors share a common axis and wherein the primary-tertiary mirror pair is fabricated on a common substrate with single point diamond turning, eliminating the need for aligning these two elements.

It is still an additional object of the present invention to provide an improved optical system and method of manufacture thereof for reducing fabrication time, alignment time and system weight while increasing mechanical stability.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment of the invention when taken in conjunction with the following drawings in which:

FIG. 3 is a schematic illustration used to explain the relative relationships of the three mirrors of the present invention;

FIGS. 4 and 5 are elevational and side views respectively, of the primary and tertiary mirrors of a three-mirror optical system fabricated in accordance with the method of the present invention;

FIGS. 6 and 7 are schematic illustrations relating to the fabrication of a primary and tertiary mirror for an optical system of the prior art and of the present invention respectively, for illustrating a significant distinction therebetween.

DETAINED DESCRIPTION OF A PREFERRED EMBODIMENT

Figure 1:
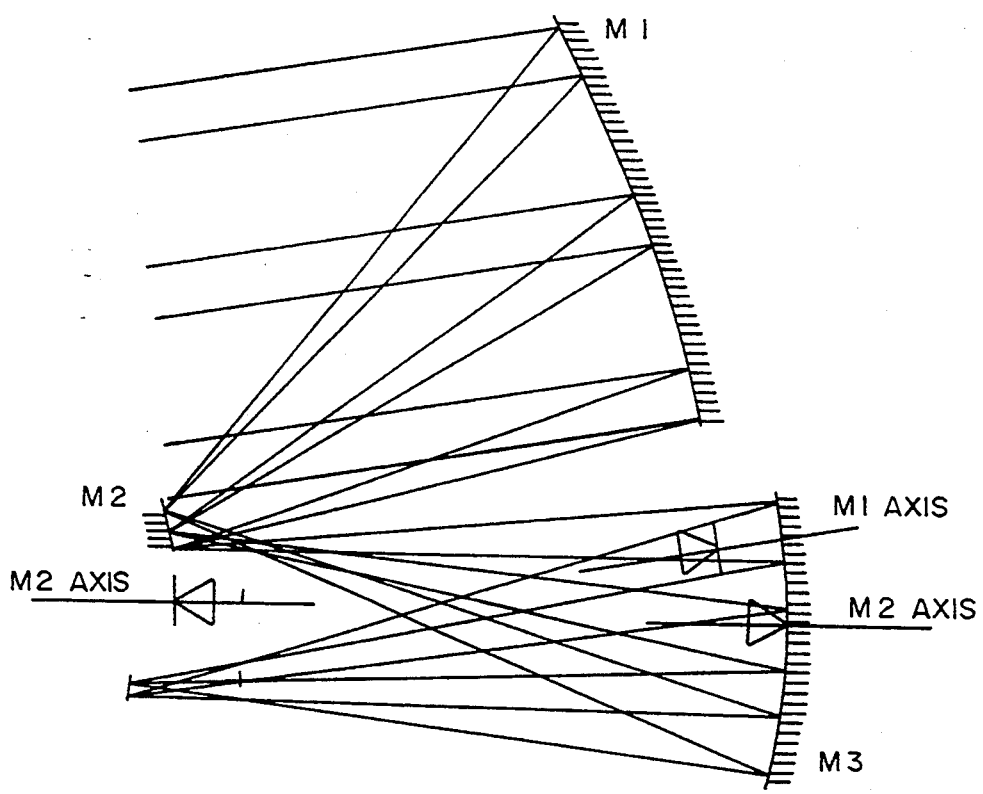
FIG. 1 is a schematic optical ray path diagram of a three-mirror optical system of the prior art.
Figure 2:
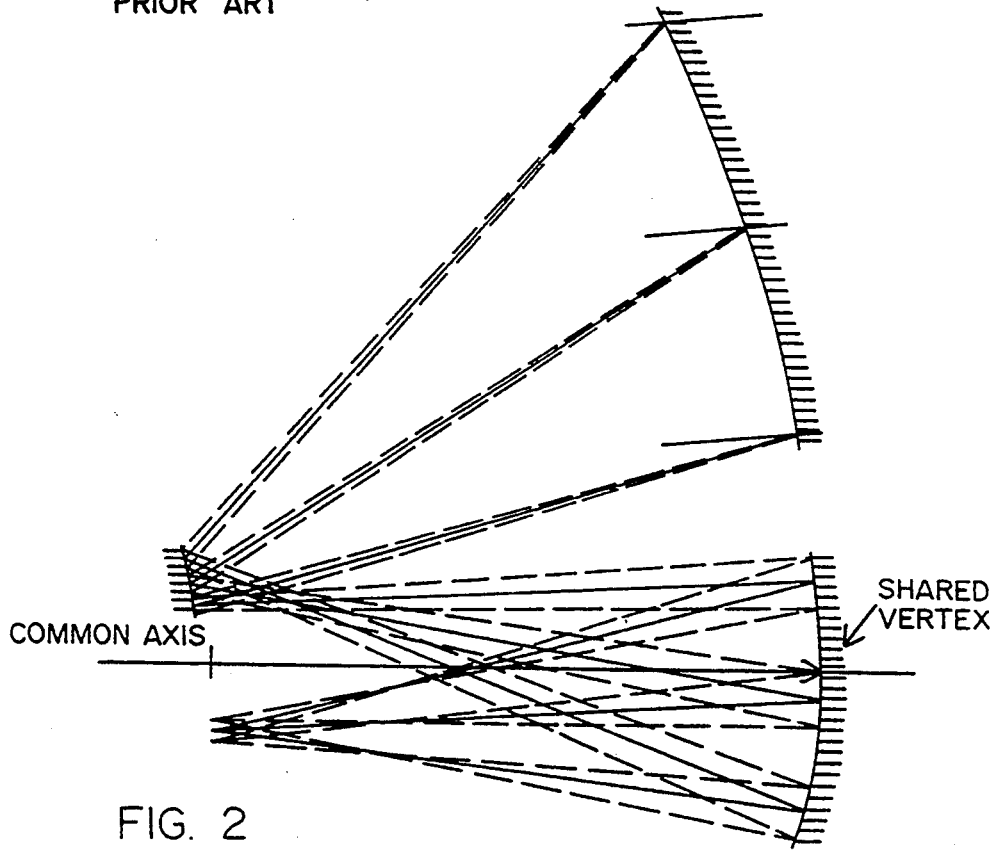
FIG. 2 is a schematic optical ray path diagram of the present invention.

Reference will first be made to FIG. 1 which illustrates a traditional off-axis three-mirror design commonly found in the prior art for use in three-mirror telescopes. As shown therein, the three mirrors comprise a primary mirror M1, a secondary mirror M2 and a tertiary mirror M3. Each such mirror is structurally independent of the other two and each such mirror has its own distinct axis which is separate from the axis of the other two mirrors. On the other hand, referring to FIG. 2, it will be seen that the three mirror configuration of the present invention, which also comprises primary mirror M1, secondary mirror M2 and tertiary mirror M3, is quite distinct from the prior art configuration of FIG. 1. More specifically, it will be seen in FIG. 2 that the three mirrors all share a common axis and that furthermore, the primary mirror M1 and the tertiary mirror M3 share a common vertex. It will be seen hereinafter that in addition to sharing a common vertex, primary mirror M1 and tertiary mirror M3 are fabricated on a common substrate, thereby fixing their relative positions to one another during fabrication and thus obviating the requirement for alignment upon assembly of the optical system.

The meaning of a common axis and a shared vertex may be better understood by reference to FIG. 3, wherein it will be seen that each mirror M1, M2 and M3 may be characterized as a selected portion of a curved surface. The surfaces of M1 and M2 are spherical and the surface of M3 is an ellipsoid. Each such surface is associated with an axis, and as shown in FIG. 3, all three such surfaces are configured to have a common unitary axis. Furthermore, the spherical surface of M1 and the ellipsoid surface of M3 are positioned to share a common vertex as shown in the right-hand portion of FIG. 3. An additional feature of the present invention, the most significant one thereof from the standpoint of manufacturability, is the shared common substrate of both M1 and M3, as seen best in FIGS. 4 and 5. FIGS. 4 and 5 are the front view and side view respectively, of a primary and tertiary mirror of the present invention fabricated on a common substrate and representing an actual reduction to practice of the invention herein disclosed. In the configuration illustrated in FIGS. 4 and 5, the primary mirror M1 is substantially circular in shape, having a vertically projected diameter of 6.25 inches, a vertex radius of 20 inches and a conic constant of −0.771. The tertiary mirror M3 is substantially rectangular, but having rounded corners with a radius of about 0.75 inches, a vertical length of 4.245 inches and a horizontal width of 5.186 inches. The distance between the center lines of the primary mirror M1 and the tertiary mirror M3 is 6.726 inches and the common optical axis line is 0.691 inches above the center line of the tertiary mirror M3. Tertiary mirror M3 has a vertex radius of 8.456 inches and a conic constant of −0.124. The substrate material may, by way of example, be aluminum, beryllium, silicon carbide or SXA.

The method of the present invention is preferably carried out using diamond turning on a lathe, the position of the diamond tip of the cutting tool being controlled in an axial direction as the cutting tool is moved radially, relative to the axis of the rotating substrate. In order to fabricate the primary and tertiary mirrors on a common substrate in accordance with the present invention, the physical spacing between the two mirrors must be such as to avoid a machining interference region so that the diamond cutting tool can first be controlled to fabricate the surface curvature of one of the two mirrors and then be independently controlled to fabricate the surface curvature of the other of the two mirrors. As previously noted, the closest prior art known to the applicant is disclosed by Korsch in U.S. Pat. No. 4,737,021. The Korsch patent discloses a design having two distinct mirrors sharing a common vertex and a common axis. However, the placement of M1 and M3 in Korsch's disclosure does not meet the necessary condition for fabricational clearance between M1 and M3 to provide the opportunity to fabricate the two mirrors on a common substrate using diamond turning. This deficiency in the prior art is illustrated in FIG. 6. FIG. 6 illustrates the relative size and placement of M1 and M3 as disclosed by Korsch. Three circles are shown therein. The circle having the smallest diameter is the inner circle of the M1 or primary mirror fabrication annulus. It represents the position of the diamond turning tool as it begins its radial motion in order to cut the surface geometry of M1, the primary mirror. The second largest circle shown in FIG. 6 is the M3 fabrication circle, that is the circular position of the diamond cutting tool upon completion of the surface fabrication of the tertiary mirror M3. The largest circle, the outermost circle of FIG. 6, represents the maximum displacement of the diamond cutting tool from the center or axis of the substrate upon completion of the surface fabrication of primary mirror M1. As seen in FIG. 6, there is a significant amount of overlap in the relative positions of the diamond cutting tool for fabrication of M1 and M3.

More specifically, because the inner circle of M1 fabrication has a smaller radius than the outer circle of M3 fabrication, the cross-hatched region shown in FIG. 6 represents the machining interference region. Clearly, in order to achieve diamond turning surface fabrication of two distinct mirrors on a common substrate, one cannot have such a machining interference region. Consequently, those having skill in the art to which the present invention pertains will now understand that the disclosure of the prior art Korsch patent is readily distinguished from the present invention by the positioning of primary and tertiary mirrors M1 and M3 respectively, which makes diamond turning surface fabrication impossible on a common substrate.

On the other hand, referring now to FIG. 7, it will be seen that in the present invention there is no overlap between the machined regions of the primary and tertiary mirrors M1 and M3 respectively, and in fact as shown in FIG. 7, there is a gap or clearance annulus represented by the unshaded area in FIG. 7 between the outer fabrication circle of tertiary mirror M3 and the inner fabrication circle of primary mirror M1. More specifically, in FIG. 7, the cross-hatched area represents the machined region of the tertiary mirror M3 and the shaded area represents the machined region of the primary mirror M1. The machining of M3 is accomplished by moving the diamond turning tool radially from the center of vertex point at the center of the circles of FIG. 7, outward in a radial direction. The same is true for the fabrication of M1. However, the radial travel of the cutting tool for fabrication of M3 is entirely distinct from and non-overlapping with the radial travel of the cutting tool for fabrication of M1.

Figure 8:
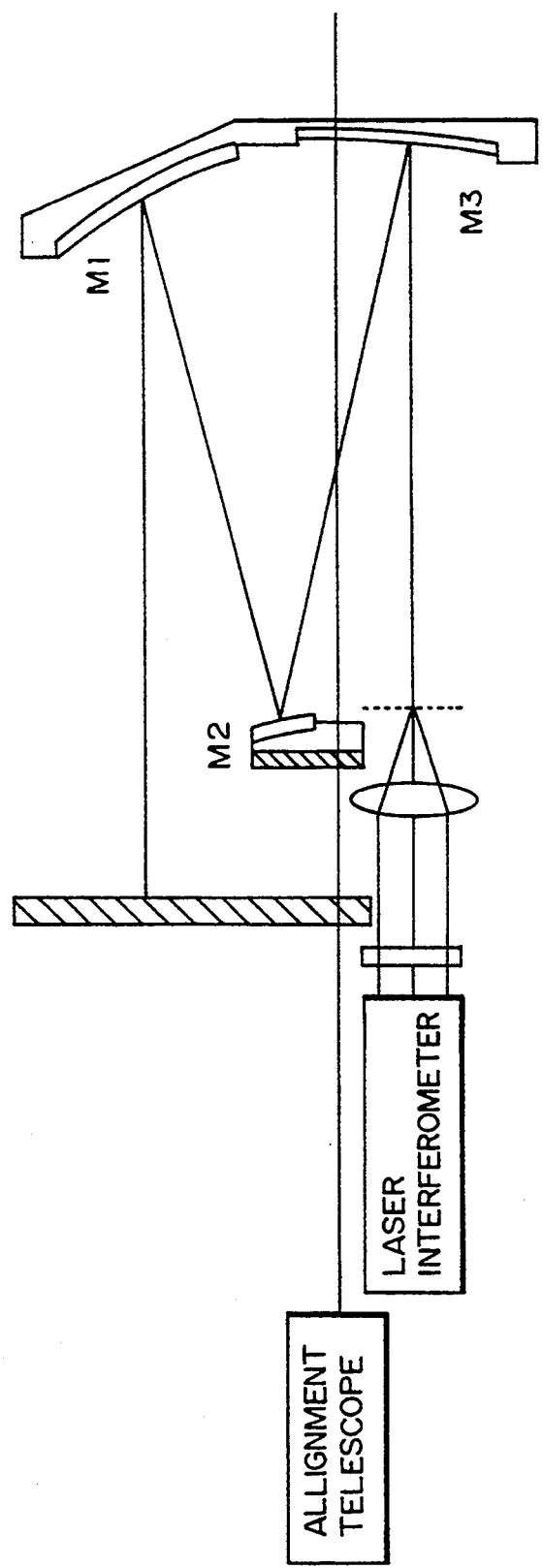
FIG. 8 is a schematic representation of a simplified alignment and test process made possible by the present invention.

As previously indicated above, one of the most significant advantages of the present invention is the reduction in the complexity of the optical alignment process that is achieved by virtue of the common substrate and fixed relative positions of the primary and tertiary mirrors M1 and M3. In this regard, FIG. 8 illustrates test set-ups for initial alignment and subsequent interferometer analysis of a three-mirror optical system using the present invention. For purposes of illustration, the primary mirror M1 and the tertiary mirror M3 are shown in FIG. 8 on a common substrate that is cut down in size compared to the substrate shown previously in FIGS. 4 and 5. Initially, alignment of M2 relative to M1 and M3 is achieved without the laser interferometer and without the large reference surface, both of which are shown in FIG. 8. The back side of the secondary mirror M2 is provided with a reference mirror surface which has an alignment mark thereon. Similarly, M3 is also provided with an alignment mark at the intersection of the common axis with M3. The distance between M2 and the substrate upon which M1 and M3 are located, is determined by a housing based upon precise calculation and design. On the other hand, the position of M2 in and out of FIG. 8 and vertically along FIG. 8 is determined by the alignment scope based upon the coincidence of the mark on the back reference mirror of M2 and the mark on M3 as viewed through the alignment scope. The principal significance of FIG. 8 is effectively what it does not show. More specifically, it does not show any need to reposition M1 relative to M3, which as previously noted are fixed relative to one another during the fabrication process because of the diamond turning of both mirrors on a common substrate. This results in a significant reduction in the number of variables that must be dealt with during the alignment process. As those having skill in the art to which the present invention pertains will readily perceive, if it were necessary, as it is in the prior art, to reposition M1 and M3 relative to one another, each such repositioning would require realignment of M2 relative to M1 and M3. The commensurate increase in the number of variables would grossly complicate the alignment process, making alignment more of an emperical process with more than one solution, some of which would not be as optimal as desired. On the other hand, as shown in FIG. 8, with M1 and M3 fixed relative to one another, and fixed also relative to the housing by means of the substrate upon which they are fabricated, the only variables are the relative position of M2 in three linear directions and in its angular orientation relative to the substrate upon which M1 and M3 are mounted. Thus, the process of alignment is far simpler and less time-consuming and thus less costly as a result of the unique fabrication process of the present invention.

After the alignment of M2 relative to the substrate of M1 and M3 is completed, the test process continues with the use of the laser interferometer and the large reference surface which receives and reflects the laser image wavefront from M1. The laser interferometer test process is a standard one in the art and need not be described herein in detail. Suffice is to say that the laser interferometer is operated in conjunction with a lens for providing an image plane upon which there is generated an interference pattern, the character of which depends upon the proper alignment and orientation of each of the mirror elements of the optical system shown in FIG. 8. Basically, the interferometer measurement is a precise means for assessing the accuracy of the alignment of M2 as previously described. In the event that the interferometer test shows that alignment is still not precisely correct, the system may still be aligned using the interferometer while making very precise minor adjustments with respect to M2 only. The fine adjustment of only M2 to optimize the alignment of the optical system of FIG. 8 is made possible as a result of the common substrate manufacturing process of the present invention which obviates adjustment of M1 and M3 in this final stage of alignment.

It will now be understood that what has been disclosed herein, comprises a novel method of fabricating a three-mirror optical system such as those used in spaceborne telescopes and comprising a primary mirror M1, a secondary mirror M2 and a tertiary mirror M3. In the invention described herein, all three such mirrors share a common axis and in addition M1 and M3 share a common vertex, but most importantly, M1 and M3 share a common substrate and relative positions on such a substrate which enable the fabrication of M1 and M3 from such a common substrate by diamond turning which obviates the independent and separate fabrication of M1 and M3. As a consequence thereof, there is a significant savings in time and labor required to optically align the three mirrors of such an optical system. There is also a significant reduction in material cost and improvement in structural stability due to the use of a common material. There is also an advantageous obviation of mechanical deformation to connect M1 and M3 to an optical support structure, a reduction in fabrication time, improved mechanical and environmental stability, a reduction in weight which is especially important for spaceborne applications and easier compliance with overall system tolerance errors because of a reduction in the tolerance errors attributable to the relative placement of M1 and M3. An embodiment of the novel method of the present invention may be characterized by the following steps:

1. Placing a rough-machined and preshaped substrate of suitable mirror material, such as aluminum, beryllium, silicon carbide or SXA into a diamond tool turning lathe;

2. Controlling the radial and axial position of the diamond turning lathe diamond cutting tool for surface fabrication of either M1 or M3;

3. Continuing diamond turning after completion of M1 or M3 fabrication for surface fabricating the remaining mirror of M1 and M3; and 4. Removing the substrate from the lathe to form a single substrate having M1 and M3 integrally fabricated thereon.

The rough-machining and preshaping indicated in step 1 is intended to minimized the dimaond turning time by providing a near net shape substrate.

Those having skill in the art to which the present invention pertains, will now as a result of the applicants' teaching herein, perceive various modifications and additions which may be made to the invention. By way of example, although specific reference has been made to a three-mirror system for use in spaceborne applications and suitable materials, shapes and dimensions have been disclosed for that purpose, it will now be understood that the fabrication method of the present invention may be suitable for the production of other plural optical components that are fixed relative to one another in an optical system. The steps of the novel method of the present invention may advantageously obviate subsequent alignment requirements for such optical components as hereinabove disclosed. Accordingly, all such modifications and additions are deemed to be within the scope of the invention which is to be limited only by the claims appended hereto and their equivalents.

We claim:

1. An optical system, comprising:
a plurality of mirrors, each of said plurality of mirrors having a predetermined arcuate surface contour, each surface contour being distinct each from the other, an extension of said arcuate surface contour defining a respective closed envelope for each of said distinctly surfaced contoured plurality of mirrors, said closed envelope for each of said mirror contours being bisected by a common axis;
two of said plurality of mirrors being integrally formed on a common substrate, each of said two mirrors being defined by a different surface contour equation whose respective closed envelopes intersect said common axis at a common point.

2. The optical system as recited in claim 1 where a first of said two mirrors has a spherical envelope.

3. The optical system as recited in claim 2 where a second of said two mirrors has an ellipsoidal envelope.

4. A three-mirror optical system, comprising:
a primary mirror having a first surface contour defined by a first surface equation, an extension of said first surface contour defining a first closed envelope;
a secondary mirror having a second surface contour defined by a second surface equation, an extension of said second surface contour defining a second closed envelope;
a tertiary mirror having a third surface contour defined by a third surface equation and being integrally formed on a common substrate with said primary mirror, said third surface equation being different than said first surface equation, an extension of said third surface contour defining a third closed envelope, each of said first, second, and third closed envelopes being bisected by a common axis and said first and third closed envelopes intersecting said common axis at a common point.

5. The three-mirror optical system as recited in claim 4 where said first closed envelope is spherical.

6. The three-mirror optical system as recited in claim 5 where said third closed envelope is ellipsoidal.

* * * * *

UNITED STATES PATENT AND TRADEMARK OFFICE
CERTIFICATE OF CORRECTION

PATENT NO. : 5,414,555
DATED : May 9, 1995
INVENTOR(S) : Gilbert Y. Chan and Kenneth G. Preston It is certified that error appears in the above-identified patent and that said Letters Patent is hereby corrected as shown below:

Title page,
Item [73] should read as follows:

Assignee: Aerojet-General Corporation (partial interest)
Rancho Cordova, Calif.

Signed and Sealed this

Twentieth Day of November, 2001

Attest:

NICHOLAS P. GODICI
*Attesting Officer*     *Acting Director of the United States Patent and Trademark Office*